United States Patent [19]
Yoshikawa et al.

[11] 3,901,762
[45] Aug. 26, 1975

[54] PROCESS FOR PRODUCTION OF A FERMENTATION PRODUCT

[75] Inventors: Junichi Yoshikawa, Takarazuka; Toyozoo Katsur, Toyonaka; Yoshikazu Fukita, Takarazuka; Hiroo Wada, Takatsuki; Yukio Tanigawa, Toyonaka, all of Japan

[73] Assignee: Sumitomo Chemical Company, Limited, Osaka, Japan

[22] Filed: Jan. 17, 1974

[21] Appl. No.: 434,220

[30] Foreign Application Priority Data
Jan. 17, 1973 Japan.................................. 48-8202

[52] U.S. Cl. ..................... 195/49; 195/96; 195/115
[51] Int. Cl............................................... C12b 1/00
[58] Field of Search............... 195/49, 96, 28 R, 115

[56] References Cited
FOREIGN PATENTS OR APPLICATIONS
14,389    1972   Japan................................... 195/49

OTHER PUBLICATIONS
Quayle, "Advances in Microbial Physiology" Academic Press, pp. 119–203, (1972).

Primary Examiner—A. Louis Monacell
Assistant Examiner—R. B. Penland
Attorney, Agent, or Firm—Stewart and Kolasch, Ltd.

[57] ABSTRACT

A process for producing a proteinous material which comprises cultivating a methanol-assimilable strain of *Pseudomonas utilis* or *Pseudomonas inaudita* in a nutrient medium containing methanol as a carbon source and recovering the accumulated proteinous material from the fermentation broth.

9 Claims, No Drawings

PROCESS FOR PRODUCTION OF A FERMENTATION PRODUCT

The present invention relates to a process for production of a fermentation product. More particularly, it relates to a process for fermentative production of a proteinous product by use of methanol as a carbon source.

The total population in the world has always a tendency of increase. It is assumed that the population will become 4,500,000,000 in 1980 and 6,000,000,000 in 2000. As the result, the demand for animal proteins will reach about 42,500,000 ton in 1980 and about 65,000,000 ton in 2000. If it is dependent on only the natural source, the shortage until 2000 will amount to about 18,000,000 ton. Thus, the dependency on synthetic proteins is essential for human life.

According to the assumption as stated above, various attempts have been made to produce proteins from petroleum sources, particularly from n-paraffin, by the utilization of microorganisms. Since methanol can be nowadays produced from petroleum on a large scale and at a low cost, its use as a carbon source in the manufacture of proteins by fermentation seems to be greatly advantageous. In fact, various methanol-assimilable microorganisms have been reported in some literatures including advances in Microbial Physiology, 7, 119 (1972), Japanese Patent Publication No. 23393/1972 and Japanese Patent Opening No. 14389/1972.

As the result of the study for screening microorganisms which can utilize methanol, there have now been found some new species of microoganisms which assimilate methanol effectively to produce proteins. The present invention is based on this finding.

According to the present invention, there is provided a process for producing a proteinous material which comprises cultivating a methanol-assimilable strain of *Pseudomonas utilis* or *Pseudomonas inaudita* in a nutrient medium containing methanol as a carbon source and recovering the accumulated proteinous material from the fermentation broth.

The microorganisms to be used in the process of this invention belong to Genus Pseudomonas. Some typical and standard strains of such microorganisms are known as *Pseudomonas utilis* Number 22 and Number 133, *Pseudomonas inaudita* Number 200, Number 300 and Number 400 in the collection of Takarazuka Research Laboratory of Sumitomo Chemical Company, Limited at Takarazuka-shi, Hyogo-ken, Japan and deposited with the Fermentation Research Institute Agency of Industrial Science and Technology at Chiba-shi, Chiba-ken, Japan under the accession numbers FERM-P No. 1690, FERM-P No. 1691, FERM-P No. 1692, FERM-P No. 1693 and FERM-P 1694, respectively.

The taxonomical characteristics of *Pseudomonas utilis* Number 22 and Number 133 are as shown in Table A wherein the methanol-inorganic salt medium has a composition consisting of dibasic ammonium phosphate (5 to 10 g), potassium chloride (2 g), magnesium sulfate heptahydrate (0.2 g), sodium chloride (0.1 g), ferrous sulfate (0.02 g), manganese sulfate (0.01 g), cobalt nitrate (0.01 g), calcium sulfate (0.01 g), cupric sulfate (0.01 g), zinc sulfate (0.01 g), water (1 L) and methanol (10 to 20 ml), the pigment production is tested on King A and B media and the utilization of carbon sources is tested by the use of a Hugh-Leifson medium and a medium having the same composition as that of the said methanol-inorganic salt medium but employing 0.5 % by weight of a carbon source to be tested in place of methanol, no visible growth of the microorganism on the cultivation at 30°C for 14 days being taken as negative.

TABLE A

Morphological characteristics:

On the observation after cultivation of 2 % methanol-inorganic salts agar slant at 30°C for 24 to 48 hours, they are bacilli of 0.5 $\mu$ × 1.0–1.5 $\mu$ in size and have motility with polar flagella. They are gram-negative, and sporulation and capsulation are not observed.

Cultural characteristics:

2 % Methanol-inorganic salt colony: round, smooth and flat, entirely fringed, semi-lens, yellowish white, glossy, translucent.

Bouillon agar colony: poor growth, round, smooth and flat, dewy, yellowish white, glossy.

2 % Methanol-inorganic salt agar slant: moderate growth, thread, yellowish white, glossy, opaque.

2 % Methanol bouillon agar slant: good growth, thread, yellowish white, opaque, no change in medium.

Bouillon agar slant: poor growth.

Bouillon culture: poor growth, slightly turbid.

Physiological characteristics:

Temperature for growth: 20° to 35°C; optimum, 25° to 30°C.

pH for growth: 5.0 to 9.0; no growth at 4.0.

Oxygen requirement: aerobic.

Litmus milk: no change or slightly alkaline.

BCP milk: no change or slightly alkaline.

Gelatin: not liquefied.

Hydrogen sulfide: not produced.

Indole: not produced.

Starch: not hydrolyzed.

Nitrate: reduced.

Nitrate respiration: weak.

Catalase reaction: positive.

Oxidase reaction: positive.

Urease reaction: negative.

Pigment: not produced.

Voges-Proskauer test: negative (methanol not added).

Methyl red test: negative (methanol not added).

Citrate utilization: none.

p-Hydroxybenzoate utilization: none.

Utilization of carbon sources: methanol, well utilized; ethanol, propanol, butanol, formic acid, acetic acid, oxalic acid, pyruvic acid, succinic acid, monomethylamine, glucose, fructose, arabinose, xylose, mannose, galactose, maltose, sucrose, lactose, trehalose, sorbitol, mannitol, inositol, glycerol and starch, usually not utilized.

Sensitivity to antibiotics: sensitive to penicillin, streptomycin, tetracycline, chloramphenicol, erythromycin and sulfaisoxazole; not sensitive to oleandomycin.

Origin: isolated from soil.

Referring to Bergey's "Manual of Determinative Bacteriology," seventh Ed., the said microorganisms can be classified into Genus Pseudomonas with respect to gram-negative, aerobic bacilli having motility with polar flagella and utilizing only methanol as a carbon source. However, they cannot be assigned to any species described therein in strict comparison. Further, they do not produce any red pigment which is produced by most of known methanol-assimilable microorganisms. Among various species of Genus Pseudomonas, they appear relatively similar to *Pseudomonas insueta* as described in Japanese Patent Publication No. 25273/1970 and *Pseudomonas methylotropha* as described in Japanese Patent Opening No. 14389/1972. However, they are different from *Pseudomonas insueta* in colony color and growth on methanol-inorganic salt agar and also from *Pseudomonas methylotropha* in colony color, indole production, growth temperature and utilization of carbon sources. Thus, they have been designated a new species and named *Pseudomonas utilis*.

The taxonomical characteristics of *Pseudomonas inaudita* Number 200, Number 300 and Number 400 are shown in Table B wherein the methanol-inorganic salt medium, the pigment production and the utilization of carbon sources are as remarked with respect to Table A.

TABLE B

Morphological characteristics:
On the observation after cultivation on 2 % methanolinorganic salts agar slant at 30°C for 24 to 48 hours, they are bacilli of 0.4–0.6 $\mu$ × 1.0–1.5 $\mu$ in size and have motility with polar flagella. They are gram-negative, and sporulation and capsulation are not observed.

Cultural characteristics:
2 % Methanol-inorganic salt agar colony: round, flat and smooth, entirely fringed, semi-lens (or convex), milky white, glossy, translucent.

Bouillon agar colony: slight growth in spot which disappears after several days.

2 % Methanol-inorganic salt agar slant: good growth, thread, milky white, glossy, translucent.

Bouillon agar slant: very poor growth.
Bouillon culture: no growth.
Physiological characteristics:
Temperature for growth: optimum, 25° to 35°C; very poor or no growth at 42°C.
pH for growth: 5.0 to 9.0; no growth at 4.0.
Oxygen requirement: aerobic.
Litmus mil: no change or slightly alkaline.
BCP milk: no change or slightly alkaline.
Gelatin: not liquefied.
Hydrogen sulfide: not produced.
Indole: not produced.
Starch: not hydrolyzed.
Nitrate: reduced.
Nitrate respiration: positive.
Catalase reaction: positive.
Oxidase reaction: positive.
Urease reaction: positive.
Pigment: not produced.
Voges-Proskauer test: negative (methanol not added).
Methyl red test: negative (methanol not added).
Citrate utilization: negative.
p-Hydroxybenzoate utilization: weakly positive.
Utilization of carbon sources: methanol, well utilized; ethanol, propanol, butanol, formic acid, acetic acid, oxalic acid, pyruvic acid, succinic acid, monomethylamine, glucose, fructose, arabinose, xylose, mannose, glactose, maltose, sucrose, lactose, trehalose, sorbitol, mannitol, inositol, glycerol and starch, usually not utilized.

Sensitivity to antibiotics: sensitive to streptomycin, tetracycline, chloramphenicol, erthromycin and sulfaisoxazole; not sensitive to penicillin and oleandomycin.

Origin: isolated from soil. Referring to Bergey's "Manual of Determinative Bacteriology," seventh Ed., the said microorganisms can be classified into Genus Pseudomonas with respect to gram-negative, aerobic bacilli having motility with polar flagella and utilizing only methanol as a carbon source. However, they can not be assigned to any species described therein in strict comparison. Further, they do not produce any red pigment which is produced by most of known methanol-assimilable microorganisms. Among various species of Genus Pseudomonas, they appear relatively similar to *Pseudomonas insueta* and *Pseudomonas methylotropha* as mentioned above. However, they are different from *Pseudomonas insueta* in colony color, growth on methanol-inorganic salt agar and utilization of carbon sources and also from *Pseudomonas methylotropha* in indole production, behavior to litmus milk and utilization of carbon sources. Besides, they are similar to *Methylomonas albus* as described in Journal of General Microbiology, 61, 205 (1970) but can be clearly differentiated from the latter by a great difference in the minimum doubling time. Thus, they have been designated a new species and named *Pseudomonas inaudita*.

The nutrient medium to be employed in this invention may be an aqueous medium containing methanol as a carbon source, a nitrogen source and inorganic salts, preferably with growth promoters such as vitamins. Since the methanol as a carbon source has somewhat a bactericidal action, care should be taken to maintain an appropriate concentration of methanol in the nutrient medium. For instance, in case of batch fermentation, the initial concentration may be kept below about 5 % by weight, and additional methanol may be supplemented to the fermentation medium from time to time with the proceeding of the fermentation and the consumption of the methanol. In case of continuous fermentation, the methanol concentration may be appropriately set depending on the bacterial concentration and the balance with other nutritive sources as well as the dilution rate. Examples of nitrogen source are inorganic ammonium salts (e.g., ammonium phosphate, ammonium sulfate, ammonium chloride, ammonium nitrate), urea, etc. Such nitrogen source is usually employed in a concentration of about 0.1 to 3 % by weight. When ammonia is used for the control of pH, it is as a matter of course utilized as a nitrogen source. As the inorganic salts, there may be exemplified salts of phosphorus, potassium, magnesium, iron, sodium, calcium, manganese, cobalt, zinc, molybdenum, copper, etc. When desired, any synthetic or natural organic substance such as vitamins, amino acids, corn steep liquor and yeast extract may be incorporated into the nutrient medium.

The cultivation may be carried out at a temperature from about 20° to 40°C. During the cultivation, the pH is preferred to be kept at about 5 to 9.

The cultivation may be effected with shaking or aeration and also batchwise or continuously. In case of batch process, the highest growth of the microorganism is attained within about 12 to 24 hours from the start of the cultivation. In the course of the batch process and at the logarithmic growth phase of the microorganism, the cultivation may be switched over to continuous process with a dilution rate of about 0.5 to 0.6.

After cultivation is completed, the bacterial body is recovered from the fermentation broth according to a conventional separation procedure such as a centrifugation, filtration and precipitation. When desired, the recovered bacterial body may be washed with water and/or subjected to treatment for extraction of proteins therefrom.

The bacterial body obtained from the fermentation broth may be sterilized and then dried by a conventional procedure such as vacuum drying, spray drying or lyophilization to give a dried proteinous material.

The wet or dry product of the bacterial body as above obtained may be used, for instance, as a supplement to feedstuffs. They may be also used as a proteinous source according to a conventional manner obvious to those skilled in the art.

Practical and presently preferred embodiments of the present invention are illustratively shown in the following Examples wherein % is by weight unless otherwise indicated.

EXAMPLE 1

Dibasic ammonium phosphate (3 g), potassium chloride (3 g), magnesium sulfate (0.4 g), sodium chloride (0.2 g), ferrous sulfate (0.04 g), manganese sulfate (0.02 g), calcium chloride (0.01 g), cobalt nitrate (0.01 g), cupric sulfate (0.01 g) and zinc sulfate (0.01 g) are dissolved in water to make a basal medium (1 L). The basal medium is charged in a 2 liter volume jar fermenter and, after sterilization, methanol as previously sterilized is added thereto to make a concentration of 1 % (weight/volume). The resulting medium is inoculated with *Pseudomonas utilis* No. 22 and then subjected to fermentation at 30°C with agitation at 600 rpm and aeration at a rate of 1 L/L/minute for 16 hours, during which the pH is maintained at 7.0 with 5.0 % ammonia water. Since the methanol is consumed with the growth of the microorganism, additional methanol (each 5 g) is added to the medium from time to time. The total amount of the additional methanol up to completion of the fermentation is 30 g. The bacterial body is separated from the fermentation broth by centrifugation, sterilized and lyophilized to give 12.0 g of the dried bacterial body per 1 L of the fermentation medium. This corresponds to a yield of 40 % based on the amount of the added methanol. The amino acid composition is shown in Table 1.

EXAMPLE 2

As in Example 1 but using *Pseudomonas utilis* No. 133, the fermentation is carried out to give 11.4 g of the dried bacterial body per 1 L of the fermentation medium. This corresponds to a yield of 38 % based on the amount of the added methanol. The crude protein content (N × 6.25) in the cells is 73.6 %. The amino acid composition is shown in Table 1.

EXAMPLE 3

As in Example 1 but using *Pseudomonas inaudita* No. 200, the fermentation is carried out to give 12.5 g of the dried bacterial body per 1 L of the fermentation medium. This corresponds to a yield of 42 % based on the amount of the added methanol. The crude protein content (N × 6.25) in the cells is 78.1 %.

EXAMPLE 4

As in Example 1 but using *Pseudomonas inaudita* No. 300, the fermentation is carried out to give 12.3 g of the dried bacterial body per 1 L of the fermentation medium. This corresponds to a yield of 41 % based on the amount of the added methanol. The crude protein content (N × 6.25) in the cells is 73.8 %.

EXAMPLE 5

As in Example 1 but using *Pseudomonas inaudita* No. 400, the fermentation is carried out to give 11.8 g of the dried bacterial body per 1 L of the fermentation medium. This corresponds to a yield of 39 % based on the amount of the added methanol. The crude protein content (N × 6.25) in the cells is 75.0 %.

EXAMPLE 6

Dibasic ammonium phosphate (3 g), potassium chloride (1 g), ammonium sulfate (0.5 g), magnesium sulfate (0.5 g), ferrous sulfate (0.25 g), sodium chloride (0.1 g), manganese sulfate (0.01 g), calcium chloride (0.01 g), cobalt nitrate (0.01 g), cupric sulfate (0.01 g) and zinc sulfate (0.01 g) are dissolved in water to make a basal medium (1 L). The basal medium is charged in a 2 liter volume jar fermenter and, after sterilization, methanol as previously sterilized is added thereto to make a concentration of 2 % (weight/volume). The resulting medium is inoculated with a seed culture of *Pseudomonas inaudita* No. 200 prepared by cultivating while shaking for 10 hours at a rate of 10 % and then subjected to fermentation at 34°C with agitation and aeration, during which the concentration of oxygen dissolved in the fermentation medium is maintained above 0.5 ppm and the pH is kept at 7.0 with 10 % ammonia water. When the methanol in the fermentation medium is consumed (i.e., when the methanol in the fermentation medium becomes almost undetected by gas chromatography), additional methanol is added thereto to make a concentration of 0.2 % (weight/volume). During the fermentation, magnesium sulfate and ferrous sulfate are portionwise added to the fermentation medium from time to time, the total amounts as added up to completion of the fermentation being respectively 1.5 g and 0.5 g. After 16 hours, the fermentation is interrupted and the fermentation broth is treated as in Example 1 to give 35.5 g of the dried bacterial body per 1 L of the fermentation medium. This corresponds to a yield of 36 % based on the amount of the added methanol.

EXAMPLE 7

As in Example 6 but using *Pseudomonas inaudita* No. 200, the fermentation (batch process) is carried out. When the cell concentration (X) in the fermentation medium reaches 23 g/L, the batch process is changed to the continuous process where a nutrient medium having a methanol concentration of 5.5 % (volume/volume) prepared by dissolving phosphoric acid (4 ml), potassium chloride (2 g), ammonium sulfate (0.5 g), magnesium sulfate (2 g), sodium chloride (0.2 g), ferrous sulfate (0.5 g), manganese sulfate (0.01 g), cobalt sulfate (0.01 g), potassium sulfate (0.01 g), cupric sulfate (0.01 g), zinc sulfate (0.01 g) and methanol (55 ml) in water to make 1 liter is continuously added to the fermentation medium at a dilution rate (D) of 0.3 and an equal amount of the fermentation broth to the added nutrient medium is taken out continuously while automatically controlling the pH at 6.8 to 7.2 with 10 % aqueous ammonia. The continuous fermentation is effected at a productivity of DX = 6.9 g/L·hr. The crude protein content in the dried bacterial body thus obtained is 78.5 %.

EXAMPLE 8

As in Example 7 but with a methanol concentration (i.e., limitative substrate concentration) of 8.5 % (volume/volume) and a dilution rate (D) of 0.3, the continuous fermentation is carried out. The cell concentration (X) is 25.5 g/L, and the yield based on methanol is 41 %. The dried bacterial body thus obtained has 78.5 % of crude proteins, 6.12 % of crude fats, 3.18 % of crude fibrous materials, 10 % of crude ashes and 4.85 % of water. The amino acid composition is shown in Table 1.

EXAMPLE 9

As in Example 7 but using *Pseudomonas inaudita* No. 300, the fermentation is carried out batchwise and then continuously (D = 0.3, X = 21 g/L), whereby the dried bacterial body having a crude protein content of 78.2 % is obtained. The amino acid composition is shown in Table 1.

EXAMPLE 10

As in Example 7 but using *Pseudomonas inaudita* No. 400, the fermentation is carried out batchwise and then continuously (D = 0.3, X = 20.5 g/L), whereby the dried bacterial body having a crude protein content of 80.1 % is obtained. The amino acid composition is shown in Table 1.

Table 1

| Amino acid | 1 | 2 | Example 8 | 9 | 10 |
|---|---|---|---|---|---|
| Tryptophane | 1.31 | 1.65 | 1.56 | 1.43 | 1.62 |
| Lysine | 6.25 | 6.43 | 5.1 | 5.22 | 5.35 |
| Histidine | 2.10 | 2.51 | 1.36 | 1.42 | 1.51 |
| Arginine | 4.52 | 4.88 | 4.6 | 5.01 | 4.23 |
| Aspartic acid | 9.31 | 9.57 | 10.72 | 10.86 | 9.86 |
| Threonine | 4.91 | 4.58 | 4.02 | 3.96 | 4.10 |
| Serine | 4.72 | 3.62 | 3.02 | 3.52 | 4.00 |
| Glutamic acid | 11.32 | 10.27 | 11.86 | 11.97 | 11.87 |
| Proline | 4.01 | 3.55 | 3.50 | 3.23 | 3.22 |
| Glycine | 4.52 | 5.57 | 6.58 | 5.97 | 5.92 |
| Alanine | 7.89 | 6.70 | 8.05 | 8.22 | 8.31 |
| Cystine | 1.1 | 1.27 | 1.42 | 1.62 | 1.58 |
| Valine | 5.40 | 5.32 | 5.38 | 5.40 | 5.72 |
| Methionine | 1.78 | 2.21 | 1.97 | 1.86 | 1.99 |
| Isoleucine | 4.72 | 4.32 | 6.69 | 5.77 | 5.82 |
| Leucine | 6.91 | 6.93 | 6.02 | 6.31 | 6.11 |
| Tyrosine | 3.4 | 2.92 | 2.60 | 2.56 | 2.86 |
| Phenylalanine | 4.50 | 3.64 | 3.38 | 3.42 | 3.47 |

EXAMPLE 11

Forty ICR strain mice of 3 weeks old were divided into two groups, the one being as a test group and the other as a control group. A feedstuff composition consisting of 38 % of corn starch, 25 % of vitamin-free casein, 10 % of alpha wheat starch, 8 % of powdery filter paper, 6 % of linolic salad oil, 6 % of inorganic salts, 5 % of granulated sugar and 2 % of vitamins was given to both groups for 5 days. Then, the same feedstuff composition as above was further continued to give to the control group, while a feedstuff composition consisting of 38 % of corn starch, 10 % of vitamin-free casein, 15 % of the dried bacterial body of *Pseudomonas inaudita* Number 200, 10 % of alpha wheat starch, 8 % of powdery filter paper, 6 % of linolic salad oil, 6 % of inorganic salts, 5 % of granulated sugar and 2 % of vitamins was given to the test group. Feeding was continued for a period of 2 weeks, during which the increased body weight of the mice was measured. The results are shown in Table 2.

Table 2

| Days from the start of feeding | Increased body weight in average (g) | |
|---|---|---|
| | Control group | Test group |
| 0 | 18.5 | 18.3 |
| 2 | 20.4 | 20.5 |
| 4 | 23.8 | 24.0 |
| 8 | 27.3 | 27.2 |
| 12 | 29.8 | 29.8 |
| 14 | 30.7 | 30.8 |

From the above results, it is understood that the increase of the body weight in the test group is substantially equal to that in the control group.

Besides, no material difference in hair gloss and skin state was seen between them. Further, no abnormality was observed in any organ dissected from the mice in the test group after feeding.

What is claimed is:

1. A process for producing a proteinous material which comprises cultivating a methanol-assimilable strain of *Pseudomonas utilis* (FERM-P No. 1690) or (FERM-P No. 1691) or *Pseudomonas inaudita* (FERM-P No. 1692), (FERM-P No. 1693) or (FERM-P No. 1694) in a nutrient medium containing methanol as a carbon source and recovering the accumulated proteinous material from the fermentation broth.

2. The process according to claim 1, wherein the nutrient medium is an aqueous medium containing methanol as a carbon source, a nitrogen source and inorganic salts.

3. The process according to claim 2, wherein the aqueous medium further contains a growth promoter.

4. The process according to claim 1, wherein the cultivation is carried out at a temperature of about 20° to 40°C.

5. The process according to claim 1, wherein the cultivation is carried out at a pH of about 5 to 9.

6. The process according to claim 1, wherein the cultivation is carried out batchwise.

7. The process according to claim 1, wherein the cultivation is carried out continuously.

8. The process according to claim 1, wherein the bacterial body is separated from the fermentation broth to obtain the proteinous material.

9. The process according to claim 6, wherein the initial concentration of the methanol in the nutrient medium is less than about 5 % by weight with additional methanol being added to the fermentation medium with the proceeding of the fermentation and the consumption of the methanol.

* * * * *

UNITED STATES PATENT OFFICE
CERTIFICATE OF CORRECTION

Patent No. 3,901,762     Dated August 26, 1975

Inventor(s) Junichi Yoshikawa et al

It is certified that error appears in the above-identified patent and that said Letters Patent are hereby corrected as shown below:

In the list of inventors: [75] change "Toyozoo Katsur" to -- Toyozoo Katsura --

Signed and Sealed this seventeenth Day of February 1976

[SEAL]

Attest:

RUTH C. MASON
Attesting Officer

C. MARSHALL DANN
Commissioner of Patents and Trademarks